US006191552B1

(12) United States Patent
Kates et al.

(10) Patent No.: US 6,191,552 B1
(45) Date of Patent: *Feb. 20, 2001

(54) EXTERNAL UNIVERSAL BATTERY CHARGING APPARATUS AND METHOD

(75) Inventors: Barry K. Kates, Austin; Greg R. Fiebrich, Georgetown, both of TX (US)

(73) Assignee: Dell USA, L.P., Round Rock, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/237,009

(22) Filed: Jan. 25, 1999

(51) Int. Cl.$^7$ .................................. H02J 7/00; H02J 1/00
(52) U.S. Cl. ........................ 320/112; 320/125; 320/165; 307/38; 307/155
(58) Field of Search ..................... 320/112, 107, 320/115, 125, 162, 114; 307/38, 42, 155; 429/9

(56) References Cited

U.S. PATENT DOCUMENTS

| | | | |
|---|---|---|---|
| 5,200,685 | * 4/1993 | Sakamoto | 320/103 |
| 5,280,229 | * 1/1994 | Faude et al. | 320/110 |
| 5,304,916 | 4/1994 | Le et al. | |
| 5,355,077 | 10/1994 | Kates | 323/224 |
| 5,383,140 | 1/1995 | Nanno et al. | 364/708.1 |
| 5,430,641 | 7/1995 | Kates | 363/133 |
| 5,486,749 | 1/1996 | Brainard | 320/9 |
| 5,504,413 | * 4/1996 | Fernandez et al. | 320/163 |
| 5,541,490 | 7/1996 | Sengupta et al. | 320/14 |
| 5,561,361 | 10/1996 | Sengupta et al. | 320/14 |
| 5,581,772 | 12/1996 | Nanno et al. | 395/750 |
| 5,689,412 | 11/1997 | Chen | 363/125 |
| 5,698,964 | 12/1997 | Kates et al. | 320/22 |
| 5,733,674 | * 3/1998 | Law et al. | 429/9 |
| 5,734,254 | 3/1998 | Stephens | 320/106 |
| 5,844,472 | * 12/1998 | Lee | 340/438 |

\* cited by examiner

Primary Examiner—Shawn Riley
Assistant Examiner—Gregory J Toatley, Jr.
(74) Attorney, Agent, or Firm—Skjerven Morrill MacPherson LLP; Stephen A. Terrile; Dale R. Cook

(57) ABSTRACT

An external universal battery charging apparatus which can include external universal battery charger circuitry having at least one universal battery charger circuitry input and at least one universal battery charger circuitry output. The universal battery charger circuitry output can include at least one battery charger output, which itself can include at least one universal battery connector and at least one universal battery charger cable. The at least one universal battery charger circuitry output can include at least one adapter pass through output, which itself can include at least one connector adapted to operably connect to an electronic device. The external universal battery charger circuitry can include at least one battery recognition and parameter adjustment circuit, battery current parameter adjustment circuit, charged voltage parameter adjustment circuit, and maximum power draw parameter adjustment circuit. The external universal battery charging apparatus can include a maximum rated power supply determination unit. The method can include detecting a battery, identifying characteristics of the battery, and adjusting at least one parameter in universal battery charger circuitry in response to the characteristics of the battery such that optimum battery charging is achieved.

15 Claims, 4 Drawing Sheets

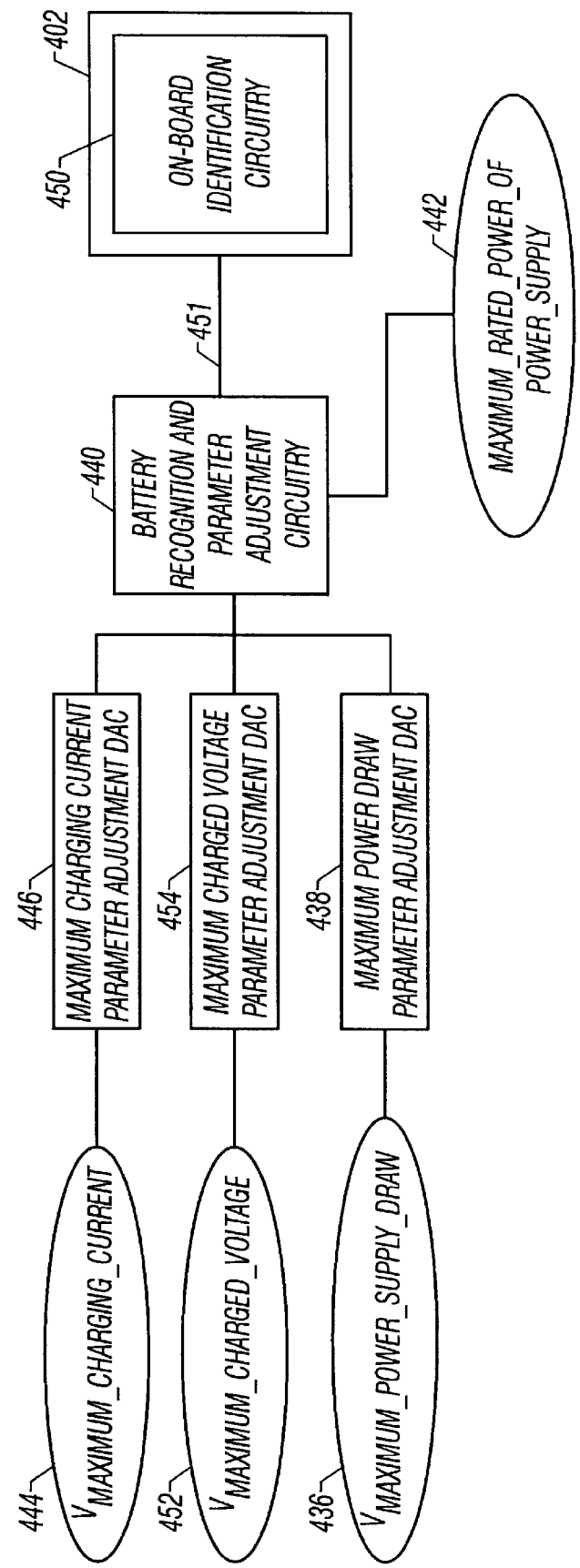

EXTERNAL UNIVERSAL BATTERY CHARGING APPARATUS AND METHOD

BACKGROUND OF THE INVENTION

1. Field of the Invention

This invention relates to the field of battery charging devices.

2. Description of the Related Art

A battery charging device is a device used to charge and recharge one or more rechargeable batteries. A battery is a device that consists of one or more cells (a cell is a device that converts a store of chemical energy into electrical energy) that are connected to act as a source of electric power. A rechargeable battery is a device whose one or more cells can be substantially reenergized once the store of chemical energy in the rechargeable battery has been partially or completely depleted.

A variety of electronic devices utilize rechargeable batteries (e.g., portable computers, portable computer peripherals, personal digital assistants (PDAs), cellular phones, and cameras). Different electronic devices often have different power usage profiles (e.g., a camera will typically have a power usage profile different from a portable computer). The same electronic devices will often have different power usage profiles dependent upon the modes of usage (e.g., a portable computer frequently accessing its hard-disk drive access typically has a significantly different power usage profile from the same portable computer which is instead accessing its Random Access Memory (RAM) rather than its hard-disk drive). These differing power usage profiles often create different size, shape, weight, and electrical loading requirements on the rechargeable batteries being used by the devices.

Because of the wide variety of power usage profiles of the devices which utilize rechargeable batteries, a number of different rechargeable battery chemistries (e.g., nickel cadmium (NiCd), nickel-metal hydride (NiMH), lithium ion (Li-ion) and lithium-polymer (Li-polymer)) have been developed, each having certain advantages and disadvantages. In general, the different rechargeable battery chemistries have been developed to provide the optimum of battery power on the basis of certain user-ranked criteria (e.g., cost, constant power drain versus "surge" or "spiked" power drain, time to recharge, total number of possible rechargings, etc.).

The use of different rechargeable battery chemistries often allow modern rechargeable batteries to provide power to their respective devices for times far in excess of rechargeable batteries used in the past. However, it is still common for user requirements to exceed battery life. For example, even the most optimum batteries utilized in modern portable computers typically provide only a useable battery life of somewhere in the neighborhood of 3 hours, with the more common cheaper batteries typically providing between 1 and 1.5 hours of useable battery life. Consequently, it is common for users to carry with them "back up" or "spare batteries" with which to replace a battery when its power is expended, especially when it is likely that a long work-session is likely (i.e., one that will extend far beyond three hours).

At the end of a long work-session, it is not uncommon for a user to have several expended batteries. Since most modern portable devices (such as portable computers) have internal battery charging circuitry, it is possible to charge at least one of these expended batteries by connecting the portable device to an AC power source. However, most users prefer to charge all batteries (i.e., more than one) simultaneously. This is typically done with the use of external battery chargers.

FIG. 1 illustrates a typical multi-battery charging scenario as it typically exists in the current art. Shown is portable computer 100. Portable computer 100 may, through DC output connector 101 and its associated cabling, be connected to AC adapter 102, which is in turn connected to AC power outlet 106. Battery pack 104 is also shown which resides within computer 100. AC adapter 102 converts AC power into DC power that can be used to power computer 100 and charge the battery pack 104.

Further shown is external battery charger 120. Depicted is external battery charger base unit 110. External battery charger base unit 110 is connected to AC adapter 112 which is in turn connected to AC power outlet 106. Battery pack 108 is also shown which resides within battery slot receptor 116 within external battery charger base unit 110. AC adapter 112 converts AC power into DC power that can be used to charge battery pack 108.

External battery charger base unit 110 is formed to receive battery pack 108. Furthermore, as was mentioned above, several different battery chemistries are now being utilized within the industry. In order to extract optimum use and life from the batteries, it is necessary to charge the batteries in the fashion most compatible with the battery chemistries. Consequently, it is common for external battery charger base unit 110 to contain charging circuitry optimized for a particular battery chemistry. Furthermore, battery slot receptor 116 also contains a battery connector (not shown) appropriate to the battery to be charged (usually the connector and charging circuitry are vendor specific, and one vendor'external charger cannot be used with another vendor'batteries; furthermore, it is usual for the charger to only be rated as safe to charge one particular type of battery chemistry).

As can be seen in FIG. 1, external battery charger 120 takes up a considerable amount of space. Furthermore, each component has a considerable amount of weight. Since battery powered devices are typically utilized to provide portability and are often transported to remote locations, external battery charger 120 must also be so transported if the ability to simultaneously recharge a number of back-up batteries is desired. Furthermore, since under the current art battery chargers are typically optimized for one particular type of battery chemistry, it is necessary to carry multiple different types of external battery chargers 120, or at the least, external battery charger base units 100, should the use of various different battery chemistries be desired.

It is apparent that external battery chargers are very useful, and that irrespective of advances in battery technology, it is likely that such a need will persist in the future. As has been discussed, current external battery chargers have considerable bulk and weight, and are typically optimized for only one type of battery chemistry. In light of the foregoing, it is therefore apparent that a need exists in the art for a method and apparatus which provide external battery chargers of considerably less bulk and weight than those currently available, and which will also serve as a universal charger across various different battery chemistries.

SUMMARY OF THE INVENTION

An apparatus and method have been devised which provide external battery chargers of considerably less bulk and weight than those currently available, and which will also serve as a universal charger across various different battery chemistries.

The external universal battery charging apparatus includes external universal battery charger circuitry having at least one universal battery charger circuitry input and at least one universal battery charger circuitry output. The at least one universal battery charger circuitry output can include at least one battery charger output. The at least one battery charger output can include at least one universal battery connector. The at least one universal battery connector can include at least one battery specific connector, and can include at least one vendor specific connector. The at least one battery charger output can include at least one universal battery charger cable. The at least one universal battery charger can include at least one adapter pass through output. The at least one adapter pass through output can include at least one connector adapted to operably connect to an electronic device. The at least one connector adapted to operably connect to an electronic device can include a DC output connector adapted to supply power to a portable computer. The external universal battery charger circuitry having at least one universal battery charger circuitry input and at least one universal battery charger circuitry output can include at least one battery recognition and parameter adjustment circuit. The external universal battery charger circuitry having at least one universal battery charger circuitry input and at least one universal battery charger circuitry output can include at least one substantially maximum charging current parameter adjustment circuit, at least one substantially maximum charged voltage parameter adjustment circuit, and at least one substantially maximum power draw parameter adjustment circuit. The universal external battery charging apparatus can include a maximum rated power supply determination unit operably connected to said battery recognition and parameter adjustment circuit.

The method can include detecting a battery, identifying characteristics of the battery, and adjusting at least one parameter in universal battery charger circuitry in response to the characteristics of the battery. The adjusting at least one parameter in universal battery charger circuitry in response to the characteristics of the battery can include obtaining substantially optimum charging parameters in response to the characteristics of the battery. The adjusting at least one parameter in universal battery charger circuitry in response to the characteristics of the battery can also include adjusting a current parameter. The adjusting at least one parameter in universal battery charger circuitry in response to the characteristics of the battery can also include adjusting a voltage parameter. The method can include adjusting at least one parameter of the universal battery charger circuitry in response to at least one characteristic of the power supply supplying power to the universal battery charger circuitry. The method can include identifying at least one characteristic of a power supply supplying power to the universal battery charger circuitry. The identifying at least one characteristic of a power supply supplying power to the universal battery charger circuitry can include identifying a substantially maximum power deliverable by the power supply supplying power to the universal battery charger circuitry. The adjusting at least one parameter of the universal battery charger circuitry in response to at least one characteristic of the power supply supplying power to the universal battery charger circuitry can include detecting a power drawn by at least one device connected to the power supply supplying power to the universal battery charger circuitry, and adjusting the at least one parameter of the universal battery charger in response to a power drawn by at least one device connected to the power supply supplying power to the universal battery charger circuitry such that the overall draw on the power supply is held within a substantially maximum power limit.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar identical items.

DETAILED DESCRIPTION

The following sets forth a detailed description of the best contemplated mode for carrying out the invention as described in the claims. The detailed description is intended to be illustrative and should not be taken as limiting.

Figure 1:
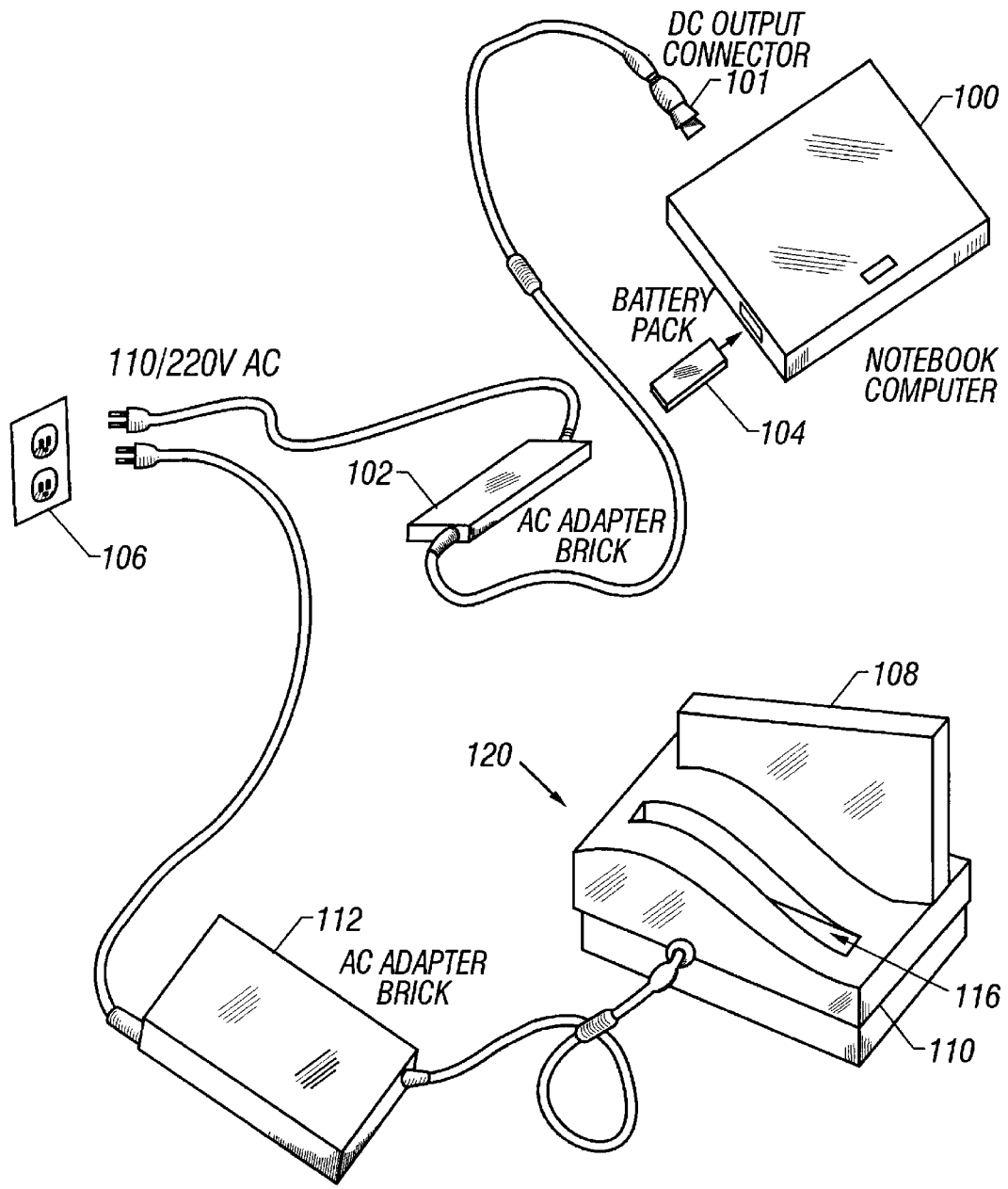
FIG. 1 illustrates a prior art scenario wherein an external battery charger is utilized.
Figure 2:
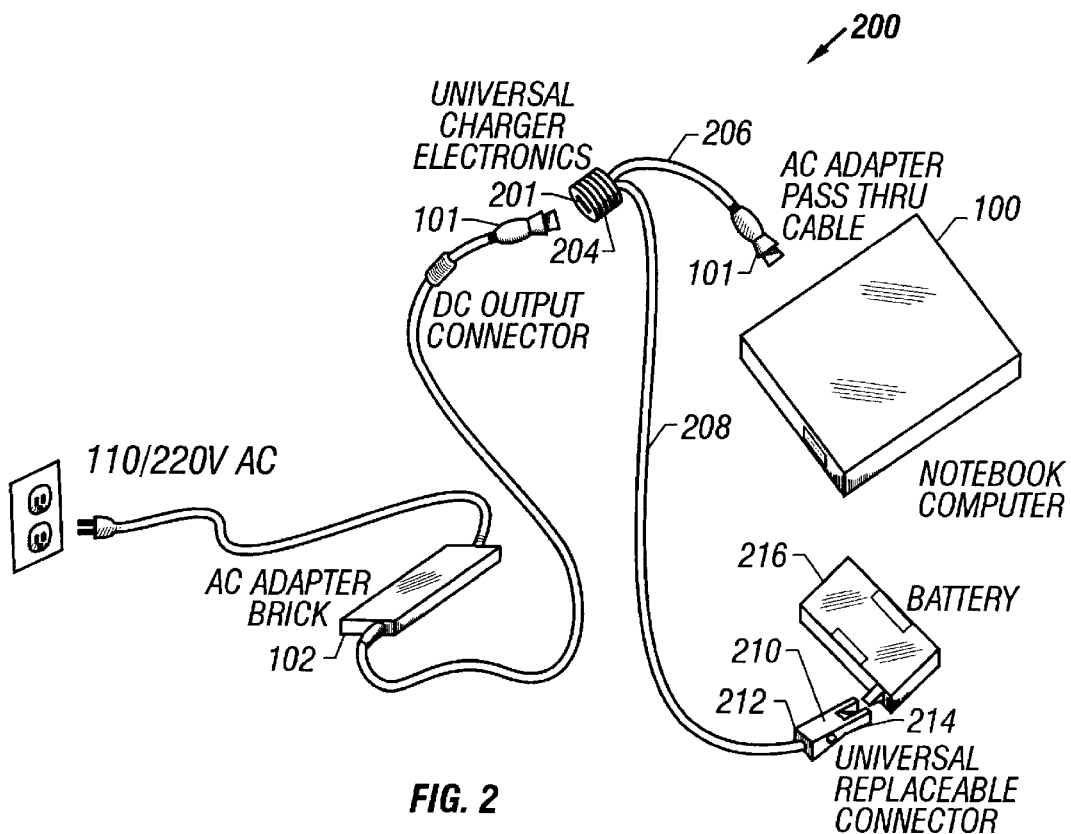
FIG. 2 illustrates an embodiment of the present invention wherein a battery is externally charged substantially contemporaneously with the powering and/or charging of a battery internal to a portable computer.

Referring now to FIG. 2, which illustrates an embodiment of the present invention wherein a battery is externally charged substantially contemporaneously with the powering and/or charging of a battery internal to a portable computer, shown is universal external battery charger 200. Shown is that universal external battery charger 200 is formed to accept and electrically connect with DC output connector 101 via DC input connector 201 contained within external charger body 204 (within which is contained universal battery charger circuitry, discussed below). Not shown, but deemed to be present within the confines of DC input connector 201, are both low and high power DC input connectors, with the low power DC input connector electrically distinguishable from the high power DC input connector in any one of a multiple of fashions well known to those with ordinary skill in the art (e.g., such as high power input having a two-prong connector and low power input having a three-prong connector).

Shown is that external charger body 204 has exiting from it two cables: a DC adapter pass through cable 206 and a universal battery charger cable 208. DC adapter pass through cable 206 terminates with DC output connector 101, which allows connection with portable computer 100 in a fashion such that the presence of universal external battery charger 204 is transparent to portable computer 100.

Depicted is that universal battery charger cable 208 terminates with universal replaceable battery connector 210.

As will be discussed below, universal external battery charger 200 will be able to recognize and adapt itself to a virtually infinite variety of battery chemistries. Those having ordinary skill in the art will recognize that oftentimes battery connectors will differ dependent upon the vendor of a battery and/or the chemistry of a battery. Universal battery connector 210 will thus be such that it will have universal battery charger cable acceptor 212 which will accept and electrically connect universal battery connector 210 to universal battery charger cable and vendor/battery chemistry specific connector 214 which will couple and electrically connect universal battery connector 210 to battery 216.

Figure 3:
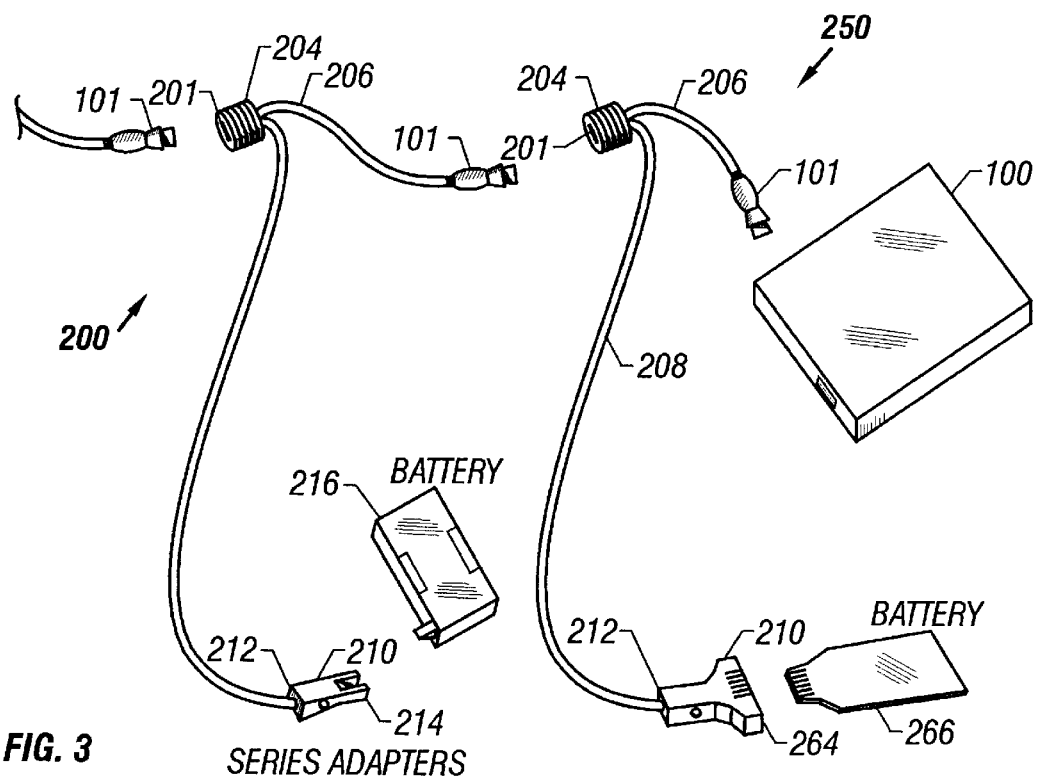
FIG. 3 illustrates an embodiment of the present invention whereby two batteries are externally charged substantially contemporaneously with the powering and/or charging of a battery internal to a portable computer.

With reference now to FIG. 3, which illustrates an embodiment of the present invention whereby two batteries are externally charged substantially contemporaneously with the powering and/or charging of a battery internal to a portable computer, shown is universal external battery charger 250; second universal external battery charger 250 functions in substantially the same way as universal external battery charger. As shown, universal external battery charger 250 is interposed between universal external battery charger 200 and portable computer 100.

Shown is that universal external battery charger 250 is formed to accept and electrically connect with DC output connector 101 via DC input connector 201 contained within external charger body 204 (within which is contained universal battery charger circuitry, described below). Not shown, but deemed to be present within the confines of DC input connector 201, are both low and high power DC input connectors, with the low power DC input connector electrically distinguishable from the high power DC input connector in any one of a multiple of fashions well known to those with ordinary skill in the art (e.g., such as high power input having a two-prong connector and low power input having a three-prong connector).

Shown is that external charger body 204 has exiting from it two cables: a DC adapter pass through cable 206 and a universal battery charger cable 208. DC adapter pass through cable 206 terminates with DC output connector 101, which allows connection with portable computer 100 in a fashion such that the presence of universal external battery charger 250 is transparent to portable computer 100.

Depicted is that universal battery charger cable 208 terminates with universal replaceable battery connector 210. As will be discussed below, universal external battery charger 250 will be able to recognize and adapt itself to a virtually infinite variety of battery chemistries. Those having ordinary skill in the art will recognize that oftentimes battery connectors will differ dependent upon the vendor of a battery and/or the chemistry of a battery. Universal battery connector 210 will thus be such that it will have universal battery charger cable 208 acceptor 212 which will accept and electrically connect universal battery connector 210 to universal battery charger cable 208 and vendor/battery chemistry specific connector 264 which will couple and electrically connect universal battery connector 210 to battery 266.

Notice that the substantial differences between external universal battery charger 200 and external universal battery charger 250 exist within universal battery connector 210. That is, insofar as vendor/battery chemistry specific connector 214 differs from vendor/battery chemistry specific connector 264, external universal battery charger 200 and external universal battery charger 250 can simultaneously charge two different type batteries, while simultaneously supplying power to personal computer 100. This capability arises from the universal battery charger circuitry, which will now be discussed.

Figure 4A:
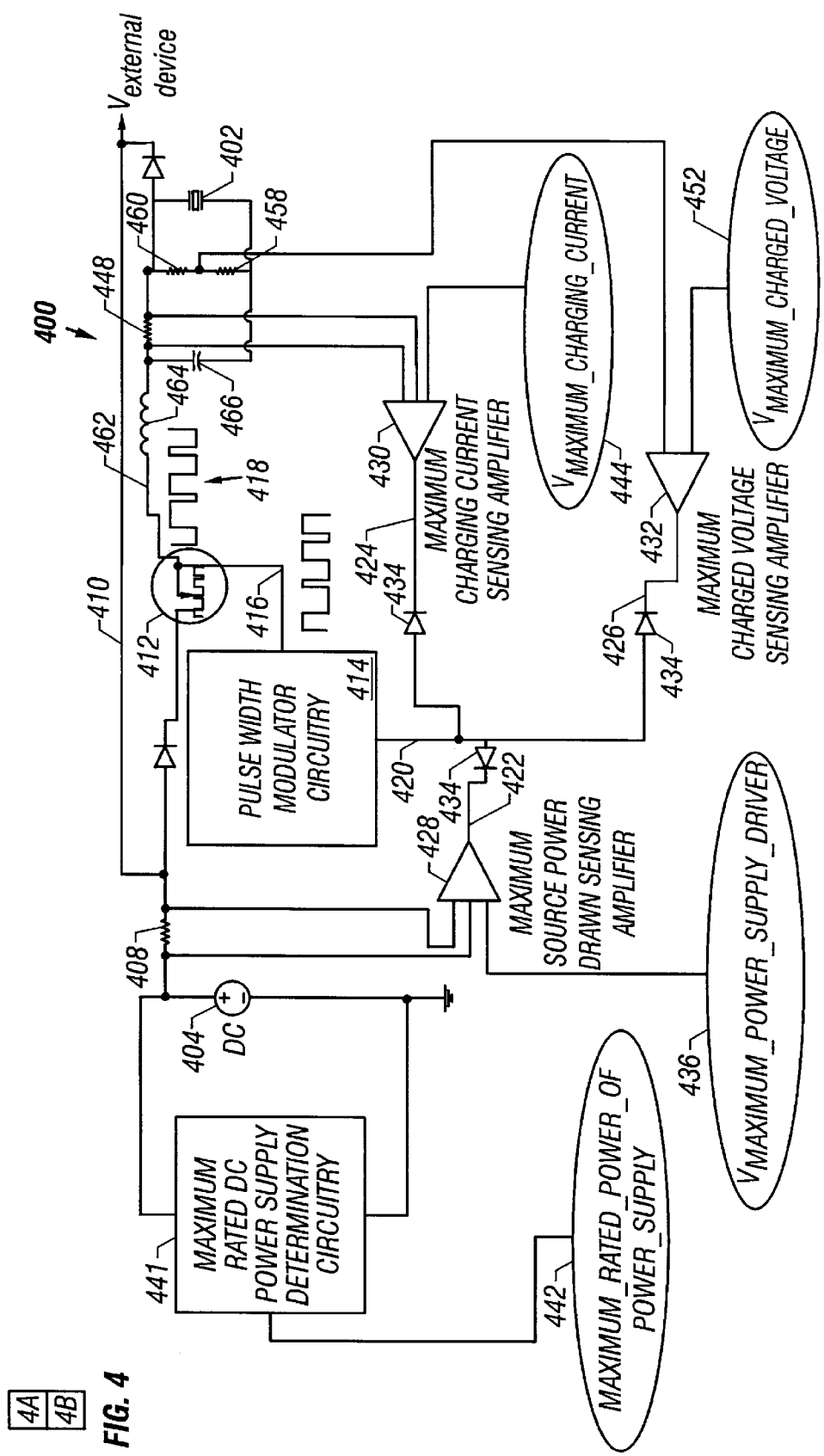
FIG. 4 illustrates a high-level block diagram of the universal battery charger circuitry.

Referring now to FIG. 4, which shows a high-level partially schematic diagram of universal battery charger circuitry 400, shown is rechargeable battery 402 which is used for illustrative purposes. Those having ordinary skill in the art will appreciate that rechargeable batteries have several factors which must be taken into account in order to provide optimum charging. A first factor is that virtually all batteries have an upper limit of the rate at which charge carriers can be transferred into/out of the battery when the battery is charged, which in practical terms means that there is a maximum limit on the current that can be used to safely charge the battery (i.e., without damaging the battery or causing risk of fire). A second factor is that due to the fact that a battery stores energy via ionic solutions maintained at different charge carrier concentrations, giving rise to a potential difference between poles of the batteries, it is possible to create a potential difference between the reservoirs sufficient such that the charge carriers will migrate to each other through the barrier separating the ionic reservoirs within the battery, effectively destroying/damaging the battery. Consequently, virtually all batteries have maximum rated charged voltage (electrical potential) beyond which they cannot be safely charged without risk of damaging the battery. Thus. by way of illustration, rechargeable battery 402 will be discussed as having a specified maximum charging current of 3 amps, and a maximum fully-charged voltage equal to 16.8 volts. It will be understood by one skilled in the art that the specified maximum charging current and maximum charged voltage are for illustrative purposes only, and may vary depending on the type of battery that is used. It should also be noted that the overcharge factor could be controlled by having a source incapable of charging beyond a battery'rated voltage, but since the present embodiment encompasses a universal battery charger, such an assumption/design choice is not be made; rather; the instant embodiment provides optimun charges for many different types of batteries and thus can supply many different charge voltages.

Prior to discussing universal battery charger 400, one additional constraint needs to be discussed. Those skilled in the art will recognize that individual power supplies, such as DC power supply 404 (which will be supplied via DC input connector 201) have maximum rated output powers beyond which they may not be effectively operated without damaging the power supplies. Since a DC power supply (such as DC power supply 404) will supply power at its rated DC voltage, this maximum power supply effectively translates itself into a maximum current that can be safely drawn from a DC power supply. For illustrative purposes, DC power supply 404 will be discussed as having a maximum rated power of 60 watts. However, those skilled in the art will recognize that other maximum rated power values are possible.

To be effective, and to function in a near optimum fashion, universal battery charger circuitry 400 must take all the foregoing constraints (maximum charging current, maximum fully-charged voltage, and the maximum source power that may be safely drawn) into account. This is achieved by using control signals sensitive to these three constraints (maximum charging current, maximum fully-charged voltage, and maximum source power drawn) to control the way in which DC power supply 404 delivers power into universal battery charger circuitry 400.

As shown, universal battery charger circuitry 400 is electrically connected to DC power supply 404. (Note that DC power supply 404 may be derived from the output of AC adapter 102, or by other conventional means.) Current flows from DC power supply 404, through resistor 408, and into power line 410, which can be used to supply power to a portable device (not shown), such as portable computer 100. Furthermore, current through resistor 408 flows into gated FET 412, ultimately for providing power to the battery 402.

Gated FET 412 is gated by pulse width modulator circuitry 414 which regulates the output of gated FET 412 via control line 416. The output of gated FET 412 is a "series" of "modulated" near-constant-voltage pulses 418 (i.e., a series of pulses of near-constant voltage maintained for varying, or "modulated," lengths of time). By varying the time-duration, or width, of each constant voltage pulse in response to battery constraints (e.g., maximum charging current and maximum charged battery voltage) and power supply constraints (e.g., maximum source power draw), universal battery charger circuitry 400 ensures that optimum charging is maintained while maximum system limits are observed.

The output of gated FET 412 is controlled by pulse width modulator circuitry 414. Pulse width modulator circuitry 414 is controlled by a voltage on control line 420, so ultimately the output of gated FET 412 is a controlled by the voltage on control line 420. Thus, the duration of each pulse in modulated pulse train 418 is dependent upon the voltage of control line 420 in a fashion which will be understood by those having ordinary skill in the art.

Since the duration each pulse of pulse train 418 emerging from gated FET 412 is controlled by the voltage on control line 420, it can be seen that the durations of the pulses in pulse train 418 are controlled by maximum source power drawn sensing amplifier output signal 422, maximum charging current sensing amplifier output signal 424, and maximum charged voltage sensing amplifier output signal 426, each of which is generated by maximum source power drawn sensing amplifier 428, maximum charging current sensing amplifier 430, and maximum charged voltage sensing amplifier 432, respectively. Notice that diodes 434 ensure that the lowest voltage on maximum source power drawn sensing amplifier output signal 422, maximum charging current sensing amplifier output signal 424, or maximum charged voltage sensing amplifier output signal 426 will be the signal controlling the duration of the pulses in pulse train 418. This allows each of maximum source power drawn sensing amplifier 428, maximum charging current sensing amplifier 430, and maximum charged voltage sensing amplifier 432 to seize control of pulse width modulator 414, and thus control the duration of the width of pulses in pulse train 418, when the reference parameter associated with maximum source power drawn sensing amplifier 428, maximum charging current sensing amplifier 430, and maximum charged voltage sensing amplifier 432 becomes most critical.

The value of maximum source power drawn sensing amplifier output signal 422 is dependent upon a reference value set for maximum source power drawn sensing amplifier 428. Those skilled in the art will recognize that this reference value typically equates to a reference voltage. In the embodiment shown, this reference voltage equates to voltage $V_{maximum\_power\_supply\_draw}$ 436 of maximum power draw parameter adjustment digital-to-analog (DAC) converter 438. Voltage $V_{maximum\_power\_supply\_draw}$ 436 of maximum power draw parameter adjustment digital-to-analog (DAC) converter 438 is controlled and set by battery recognition and parameter adjustment circuitry 440.

Battery recognition parameter and adjustment circuitry 440 sets $V_{maximum\_power\_supply\_draw}$ 436 such that the power drawn through resistor 408 does not exceed the maximum rated power of DC power supply 404. The maximum rated power of DC power supply 404 is determined by maximum rated DC power determination circuitry 441, which determines the maximum rated power and transmits this value to battery recognition and parameter adjustment circuitry 440 via maximum rated power value signal 442. In one embodiment, this is achieved by having two different input pin configurations (not shown) associated with the two different input DC power supplies 404 whose maximum rated power draws are different; however, those skilled in the art will recognize that many other alternative methods of determining the maximum power which may be supplied by DC power supplies (e.g., via communication with intelligent logic circuitry within a DC power supply).

DC power supply 404 is connected to its loads through a series connection with resistor 408. Since the voltage from DC power supply 404 is constant, the power drawn from DC power supply 404 can be calculated using the well-known equation P=VI, where V equals the voltage across resistor 408 and I equals the current drawn through resistor 408. As has been discussed, for sake of illustration the maximum power available from the DC power supply 404 has been assumed to be 60 watts. Consequently, a reference voltage will be set for maximum source power drawn sensing amplifier 428 such that a control signal voltage is generated on maximum source power drawn sensing amplifier output signal 422 when the voltage developed across resistor 408 indicates that a current is being drawn which is indicative that the power drawn from DC power supply 404 is approaching the 60 watt maximum. In response, control signal 420 will force pulse width modulator circuitry 414 to decrease the width of pulses in pulse train 418 of FET 412 such that the aggregate power drawn from DC power supply 404 stays within the defined maximum of 60 watts, or less.

The value of maximum charging current sensing amplifier output signal 424 is dependent upon a reference value set for maximum charging current sensing amplifier 430. Those skilled in the art will recognize that this reference value typically equates to a reference voltage. In the embodiment shown, this reference voltage equates to voltage $V_{maximum\_charging\_current}$ 444 of maximum charging current parameter adjustment digital-to-analog (DAC) converter 446. Voltage $V_{maximum\_charging\_current}$ 444 of maximum charging current parameter adjustment digital-to-analog (DAC) converter 446 is controlled and set by battery recognition and parameter adjustment circuitry 440.

Battery recognition parameter and adjustment circuitry 440 sets voltage $V_{maximum\_charging\_current}$ 444 such that the power drawn through resistor 448 does not exceed the maximum rated current of battery 402 (a substantially uncharged battery will supply virtually no resistance to current, so when charging is begun virtually all current will flow into battery 402 rather than down series resistors 458, 460). The maximum rated current of battery 402 is determined by battery recognition and parameter adjustment circuitry 440 via communication with on-battery identification circuitry 450 via bus 451, which those skilled in the art will recognize can be, for example, a bus using protocols compliant with that of the *Smart Battery System Specifications, Revision* 1.0, dated Feb. 15, 1995, incorporated by reference herein in its entirety, although other buses and protocols can also be used. The electrical connection of bus 451 will be achieved, in part, via universal battery charger cable 208 and universal replaceable battery connector 210 connecting with the appropriate electrical connectors on any particular battery.

Battery 402 is supplied current through series connections with resistor 448. Thus, the maximum current drawn by battery 404 will never be greater than that drawn through resistor 448. Since the value of resistor 448 is known, the maximum current supplied to battery 402 can be calculated using the well-known equation P=VI, where V equals the voltage across resistor 448 and I equals this voltage divided by value of resistor 448. As has been discussed, for sake of illustration the maximum rated current of battery 404 has been assumed to be 3 watts. Consequently, a reference voltage will be set for maximum charging current sensing amplifier 430 such that it generates a control signal voltage on maximum charging current sensing amplifier output signal 424 when the voltage developed across resistor 448 indicates that the current drawn through resistor 448 is approaching the 3 watt maximum. In response, control signal 420 will force pulse width modulator circuitry 414 to decrease the width of pulses in pulse train 418 of FET 412 such that the current drawn through resister 448 stays within the defined maximum of 3 watts, or less.

The value of maximum charged voltage sensing output signal 426 is dependent upon a reference value set for maximum charged voltage sensing amplifier 432. Those skilled in the art will recognize that this reference value typically equates to a reference voltage. In the embodiment shown, this reference voltage equates to voltage $V_{maximum\_charged\_voltage}$ 452 of maximum charged voltage parameter adjustment digital-to-analog (DAC) converter 454. Voltage $V_{maximum\_charged\_voltage}$ 452 of maximum charged voltage parameter adjustment digital-to-analog (DAC) converter 454 is controlled and set by battery recognition and parameter adjustment circuitry 440.

Battery recognition parameter and adjustment circuitry 440 sets voltage $V_{maximum\_charged\_voltage}$ 452 such that the voltage developed across resistor 458 is such that the voltage developed across resistors 458, 460 does not exceed the maximum rated charged voltage of battery 402. The maximum rated charged voltage of battery 402 battery recognition and parameter adjustment circuitry 440 is determined via communication with on-battery identification circuitry 450 via bus 451, which those skilled in the art will recognize can be, for example, a bus using protocols compliant with that of the *Smart Battery System Specifications, Revision 1.0*, dated Feb. 15, 1995, incorporated by reference herein in its entirety although other buses and protocols can also be used. The electrical connection of bus 451 will be achieved, in part, via universal battery charger cable 208 and universal replaceable battery connector 210 connecting with the appropriate electrical connectors on any particular battery.

Battery 404 is connected in parallel with resistors 458, 460, and thus the voltage across battery 404 will be that across series connected resistors 458, 460. Since the values of resistors 458, 460 are known, the fractional voltage developed across 458 can be calculated such that the total voltage drop across series combination of resistors 458, 460 is known, by use of the well-known equation P=VI, where V equals the voltage across resistor 458. As has been discussed, for sake of illustration the maximum rated charge voltage of battery 404 has been assumed to be 16.8 volts. Consequently, a reference voltage $V_{maximum\_charged\_voltage}$, 452 will be set for maximum charged voltage sensing amplifier 432 such that it generates a control signal voltage on maximum charge voltage sensing amplifier output signal 426 when the voltage developed across resistor 458 indicates that the voltage across series combination or resistors 458, 460, and thus battery 402, is approaching the 16.8 volt maximum. In response, control signal 420 will force pulse width modulator circuitry 414 to decrease the width of pulses in pulse train 418 of FET 412 such that the current drawn through resister 458 stays within bounds such that the voltage developed across the battery stays within the defined maximum voltage of 16.8 volts, or less.

As a final point, it should be noted that pulse train 418 is transmitted, via line 462, through an inductor L 464 and capacitor 466 C combination. Inductor L 464 serves as a current "choke" to ensure that when gated FET 412 is turned on, not all the current of DC power supply 404 is instantaneously available to the loads supplied through inductor L 464, which would be the case in the absence of inductor L 464.

In addition to the foregoing, another embodiment can be achieved by use of battery charger circuitry described in U.S. Pat. No. 5,698,964, entitled *Adaptive Power Battery Charging Apparatus*, filed by Barry K. Kates and Edward P. Sheehan, Jr., on Oct. 20, 1995, which is incorporated by reference herein in its entirety. The adaptive battery charger described in U.S. Pat. No. 5,698,964, monitors power provided to the computer system and adaptively utilizes all available power for charging the batteries, both when the computer system is in use, and when the computer system is not in use.

Those skilled in the art will recognize that maximum rated DC power determination circuitry 441, pulse width modulator circuitry 414, battery recognition and parameter adjustment circuitry 440, and on-battery identification circuitry 450 can be any one of a microcontroller, an application specific integrated circuit (ASIC), a microprocessor, and embedded processor, or any other suitable control device.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

The foregoing described embodiments depict different components contained within, or connected with, different other components. It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use of definite articles used to introduce claim elements.

What is claimed is:

1. An external universal battery charging apparatus comprising:

external universal battery charger circuitry having at least one universal battery charger circuitry input and at least one universal battery charger circuitry output; and said at least one universal battery charger circuitry output comprising at least one battery charger output and at least one power line output, said external universal battery charger circuitry having continuously adaptive power draw circuitry structured such that an amount of power rendered available to the at least one battery charger output is substantially equal to a maximum source power draw, specified by a maximum-source-power-draw control line of a battery recognition and parameter adjustment circuit, less power sensed substantially simultaneously drawn by the at least one power line output.

2. The apparatus of claim 1, wherein the at least one battery charger output further includes:

at least one universal battery connector.

3. The apparatus of claim 2, wherein said at least one universal battery connector further includes:

at least one battery specific connector.

4. The apparatus of claim 2 wherein said at least one universal battery connector further includes:

at least one vendor specific connector.

5. The apparatus of claim 1, wherein the at least one battery charger output further includes:

at least one universal battery charger cable.

6. The apparatus of claim 1, wherein the at least one universal battery charger circuitry output further includes:

at least one adapter pass through output.

7. The apparatus of claim 6, wherein said at least one adapter pass through output further includes:

at least one connector adapted to operably connect to an electronic device.

8. The apparatus of claim 7, wherein said at least one connector adapted to operably connect to an electronic device further includes:

a DC output connector adapted to supply power to a portable computer.

9. The apparatus of claim 1, further comprising:

a maximum rated power supply determination unit operably connected to said battery recognition and parameter adjustment circuit.

10. The external universal power supply apparatus of claim 1, wherein the continuously adaptive power draw circuitry structured such that an amount of power rendered available to the at least one battery charger output is substantially equal to a maximum source power draw, specified by a maximum-source-power-draw control line of a battery recognition and parameter adjustment circuit, less power sensed substantially simultaneously drawn by the at least one power line output further includes:

the continuously adaptive power supply circuitry structured to limit power drawn from the amount of power rendered available such that a maximum battery charging current, specified by a maximum-battery-charging-current control line of the battery recognition and parameter adjustment circuit, is not exceeded.

11. The external universal power supply apparatus of claim 10, wherein the continuously adaptive power supply circuitry structured to limit power drawn from the amount of power rendered available such that a maximum battery charging current, specified by a maximum-battery-charging-current control line of the battery recognition and parameter adjustment circuit, is not exceeded further includes:

a maximum-battery-charging-current sensing amplifier operably coupled to the maximum-battery-charging-current control line of the battery recognition and parameter adjustment circuit.

12. The external universal power supply apparatus of claim 1, wherein the continuously adaptive power draw circuitry structured such that an amount of power rendered available to the at least one battery charger output is substantially equal to a maximum source power draw, specified by a maximum-source-power-draw control line of a battery recognition and parameter adjustment circuit, less power sensed substantially simultaneously drawn by the at least one power line output further includes:

the continuously adaptive power supply circuitry structured to limit power drawn from the amount of power rendered available such that a maximum charged battery voltage, specified by a maximum-charged-battery-voltage control line of the battery recognition and parameter adjustment circuit, is not exceeded.

13. The external universal power supply apparatus of claim 12, wherein the continuously adaptive power supply circuitry structured to limit power drawn from the amount of power rendered available such that a maximum charged battery voltage, specified by a maximum-charged-battery-voltage control line of the battery recognition and parameter adjustment circuit, is not exceeded further includes:

a maximum-charged-battery-voltage sensing amplifier operably coupled to the maximum-charged-battery-voltage control line of the battery recognition and parameter adjustment circuit.

14. The external universal power supply apparatus of claim 1, wherein the continuously adaptive power draw circuitry structured such that an amount of power rendered available to the at least one battery charger output is substantially equal to a maximum source power draw, specified by a maximum-source-power-draw control line of a battery recognition and parameter adjustment circuit, less power sensed substantially simultaneously drawn by the at least one power line output further includes:

a maximum-source-power-drawn sensing amplifier operably coupled to the maximum-source-power-draw control line of the battery recognition and parameter adjustment circuit.

15. The external universal power supply apparatus of claim 1, further comprising:

an external charger body enclosing said external universal battery charger circuitry.

* * * * *